(12) United States Patent
Ouellette et al.

(10) Patent No.: US 10,599,332 B2
(45) Date of Patent: Mar. 24, 2020

(54) CURSOR CONTROL FOR AIRCRAFT DISPLAY DEVICE

(71) Applicant: BOMBARDIER INC., Dorval (CA)

(72) Inventors: Benoit Ouellette, Verdun (CA); Frederic Leblanc, Sainte-Thérèse (CA); Philippe Doyon Poulin, Montreal (CA); Noemie Seguin Tremblay, Montreal (CA)

(73) Assignee: BOMBARDIER INC., Dorval (CA)

( * ) Notice: Subject to any disclaimer, the term of this patent is extended or adjusted under 35 U.S.C. 154(b) by 363 days.

(21) Appl. No.: 15/129,211

(22) PCT Filed: Mar. 26, 2015

(86) PCT No.: PCT/IB2015/052249
§ 371 (c)(1),
(2) Date: Sep. 26, 2016

(87) PCT Pub. No.: WO2015/150994
PCT Pub. Date: Oct. 8, 2015

(65) Prior Publication Data
US 2018/0181299 A1 Jun. 28, 2018

Related U.S. Application Data

(60) Provisional application No. 61/972,501, filed on Mar. 31, 2014.

(51) Int. Cl.
*G06F 3/0481* (2013.01)
*G06F 3/0489* (2013.01)
*G06F 3/0484* (2013.01)

(52) U.S. Cl.
CPC ...... *G06F 3/04892* (2013.01); *G06F 3/04812* (2013.01); *G06F 3/04842* (2013.01)

(58) Field of Classification Search
CPC ............. G06F 3/04892; G06F 3/04842; G06F 3/04812
See application file for complete search history.

(56) References Cited

U.S. PATENT DOCUMENTS

| | | | |
|---|---|---|---|
| 5,340,061 A | | 8/1994 | Vaquier et al. |
| 5,596,699 A | * | 1/1997 | Driskell ................ G06F 3/0482 715/834 |

(Continued)

FOREIGN PATENT DOCUMENTS

| | | |
|---|---|---|
| EP | 1235136 B1 | 4/2009 |
| EP | 2693766 A1 | 2/2014 |
| GB | 2357945 A | 12/1999 |

OTHER PUBLICATIONS

PCT international Search Report and Written Opinion dated Jun. 9, 2015 re: International Application No. PCT/IB2015/052249.

(Continued)

*Primary Examiner* — Antonio Xavier
(74) *Attorney, Agent, or Firm* — Norton Rose Fulbright Canada LLP

(57) ABSTRACT

Systems, methods and computer program products for controlling the movement of a cursor on a display device in an aircraft are disclosed. An exemplary method disclosed comprises the use of a digital representation of a grid defining a plurality of cells overlaying at least a portion of a display area of the display device to control the movement of the cursor over the display area. The grid may be invisible to the user during operation.

21 Claims, 14 Drawing Sheets

(56) References Cited

U.S. PATENT DOCUMENTS

| | | | |
|---|---|---|---|
| 6,005,573 A * | 12/1999 | Beyda | G06F 3/0485 |
| | | | 715/212 |
| 6,185,582 B1 * | 2/2001 | Zellweger | G06F 17/246 |
| | | | 715/212 |
| 6,381,519 B1 | 4/2002 | Snyder | |
| 6,417,867 B1 * | 7/2002 | Hallberg | G06T 3/0025 |
| | | | 345/660 |
| 6,512,527 B1 | 1/2003 | Barber et al. | |
| 6,668,215 B2 | 12/2003 | Lafon et al. | |
| 6,707,475 B1 | 3/2004 | Snyder | |
| 6,784,869 B1 | 8/2004 | Clark et al. | |
| 6,980,198 B1 | 12/2005 | Gyde et al. | |
| 7,113,167 B2 | 9/2006 | Roux | |
| 7,123,999 B2 | 10/2006 | Lafon et al. | |
| 7,212,890 B2 | 5/2007 | Lafon et al. | |
| 7,242,386 B2 | 7/2007 | Roux | |
| 7,250,934 B2 | 7/2007 | Roux | |
| 7,724,240 B2 | 5/2010 | Gyde et al. | |
| 2001/0017634 A1 * | 8/2001 | Scott | G06F 3/04892 |
| | | | 715/767 |
| 2002/0023271 A1 | 2/2002 | Augenbraun et al. | |
| 2002/0113784 A1 * | 8/2002 | Feilmeier | G06F 1/1626 |
| | | | 345/419 |
| 2003/0112280 A1 * | 6/2003 | Driskell | G06F 3/0482 |
| | | | 715/835 |
| 2003/0177497 A1 * | 9/2003 | Macrae | G06Q 30/0241 |
| | | | 725/60 |
| 2004/0017360 A1 * | 1/2004 | Emerson | G06F 3/021 |
| | | | 345/168 |
| 2006/0154228 A1 * | 7/2006 | Schrab | G09B 5/00 |
| | | | 434/365 |
| 2008/0109743 A1 * | 5/2008 | Gibson | G06F 3/0486 |
| | | | 715/769 |
| 2008/0111833 A1 * | 5/2008 | Thorn | G09G 5/00 |
| | | | 345/690 |
| 2010/0153999 A1 * | 6/2010 | Yates | H04N 5/44543 |
| | | | 725/39 |
| 2011/0093819 A1 * | 4/2011 | Irvine | G06F 3/038 |
| | | | 715/856 |
| 2011/0289447 A1 * | 11/2011 | Kawaguti | G06F 3/0481 |
| | | | 715/780 |
| 2012/0036434 A1 * | 2/2012 | Oberstein | G06F 3/0482 |
| | | | 715/702 |
| 2014/0040824 A1 * | 2/2014 | Gehring | H04N 21/42204 |
| | | | 715/810 |

OTHER PUBLICATIONS

European Patent Office, Communication Pursuant to Article 94(3) EPC dated Sep. 12, 2017 re: European Application No. 15 716 148.0.

* cited by examiner

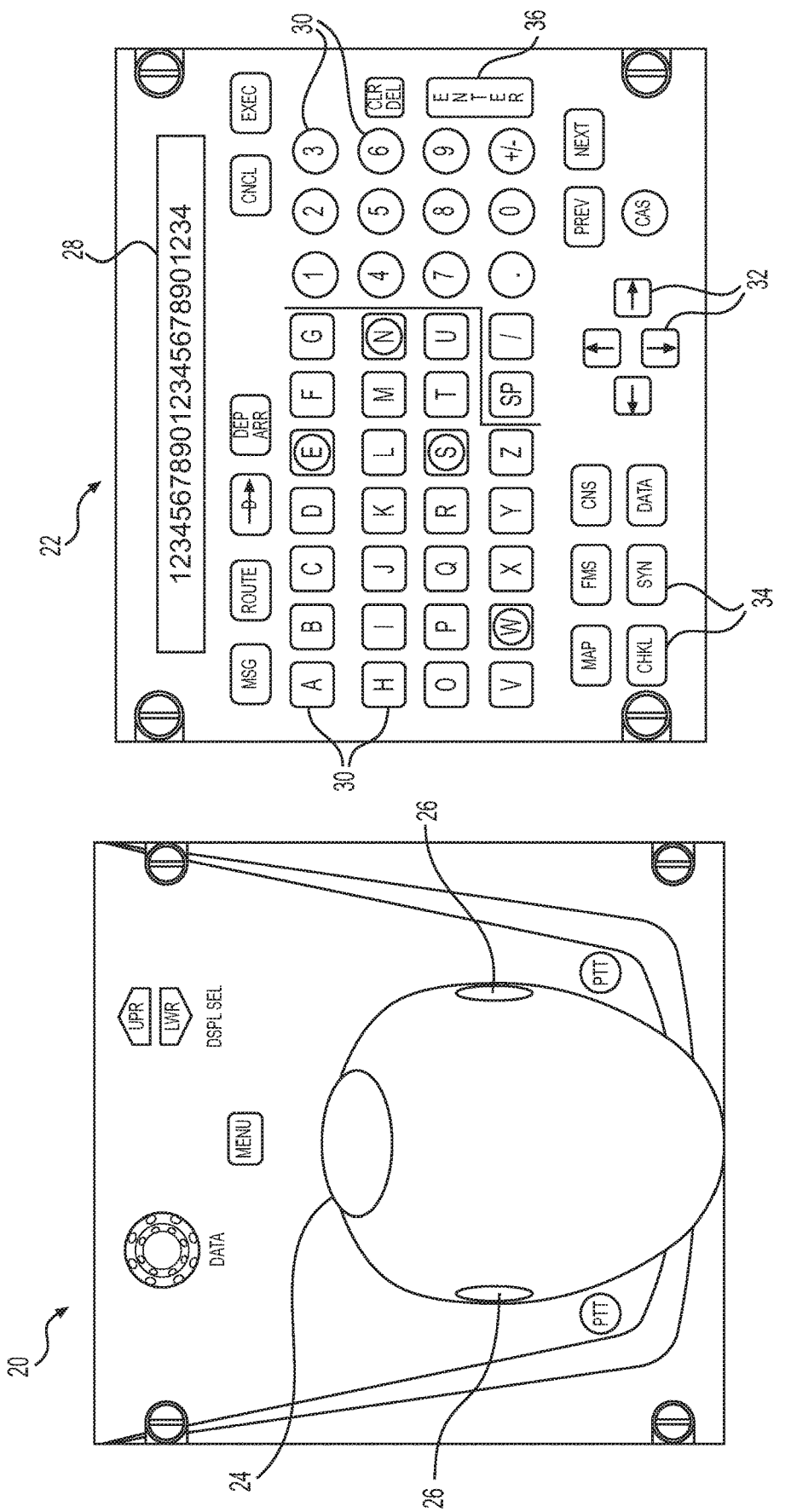

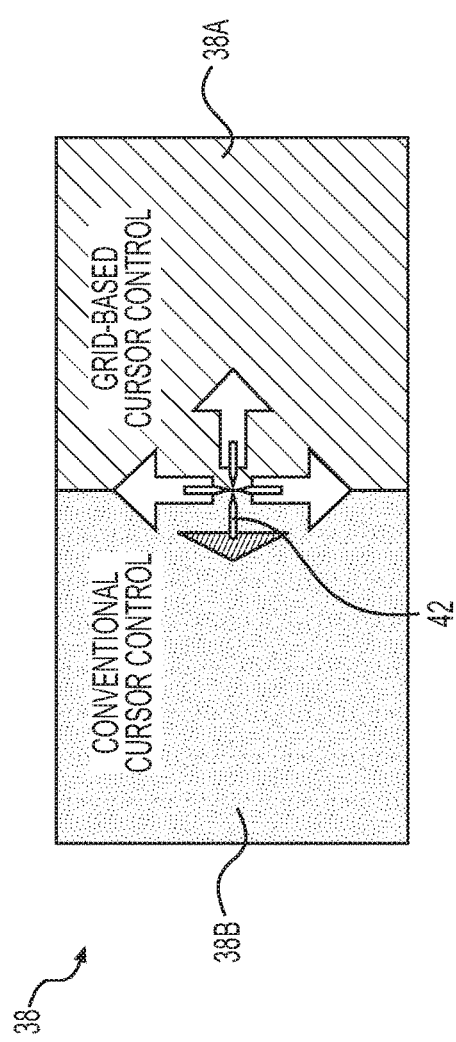
FIG. 15
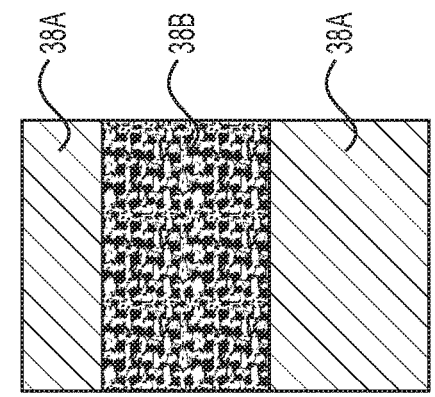
FIG. 16C
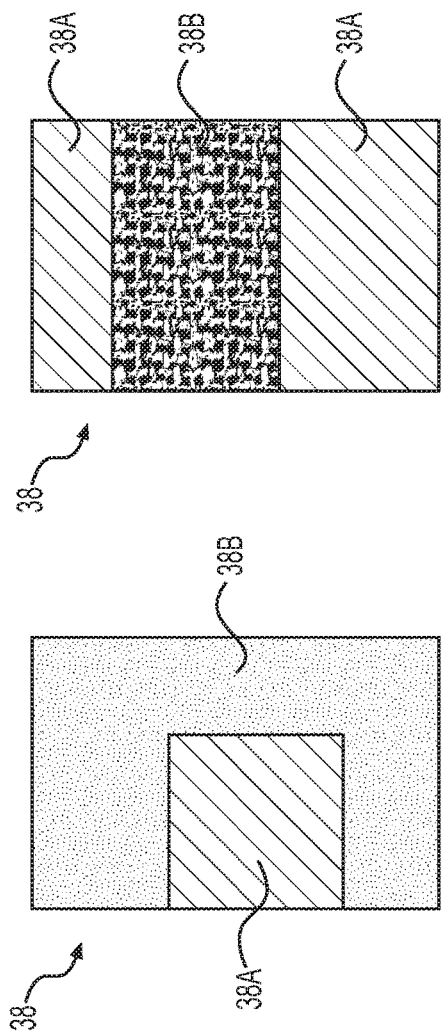
FIG. 16B
FIG. 16A

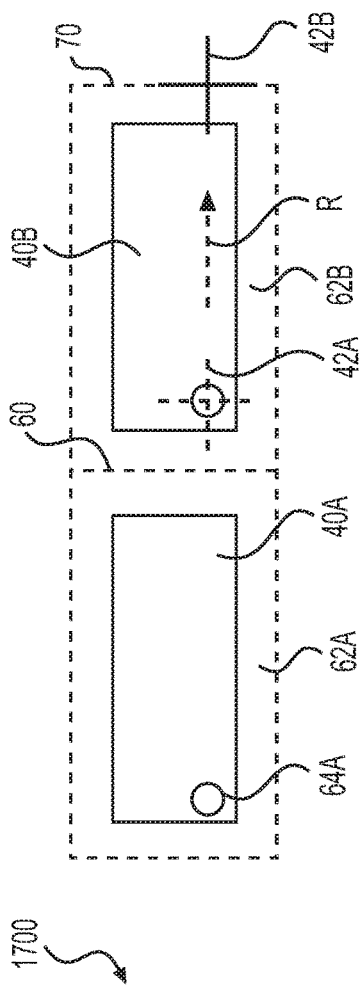
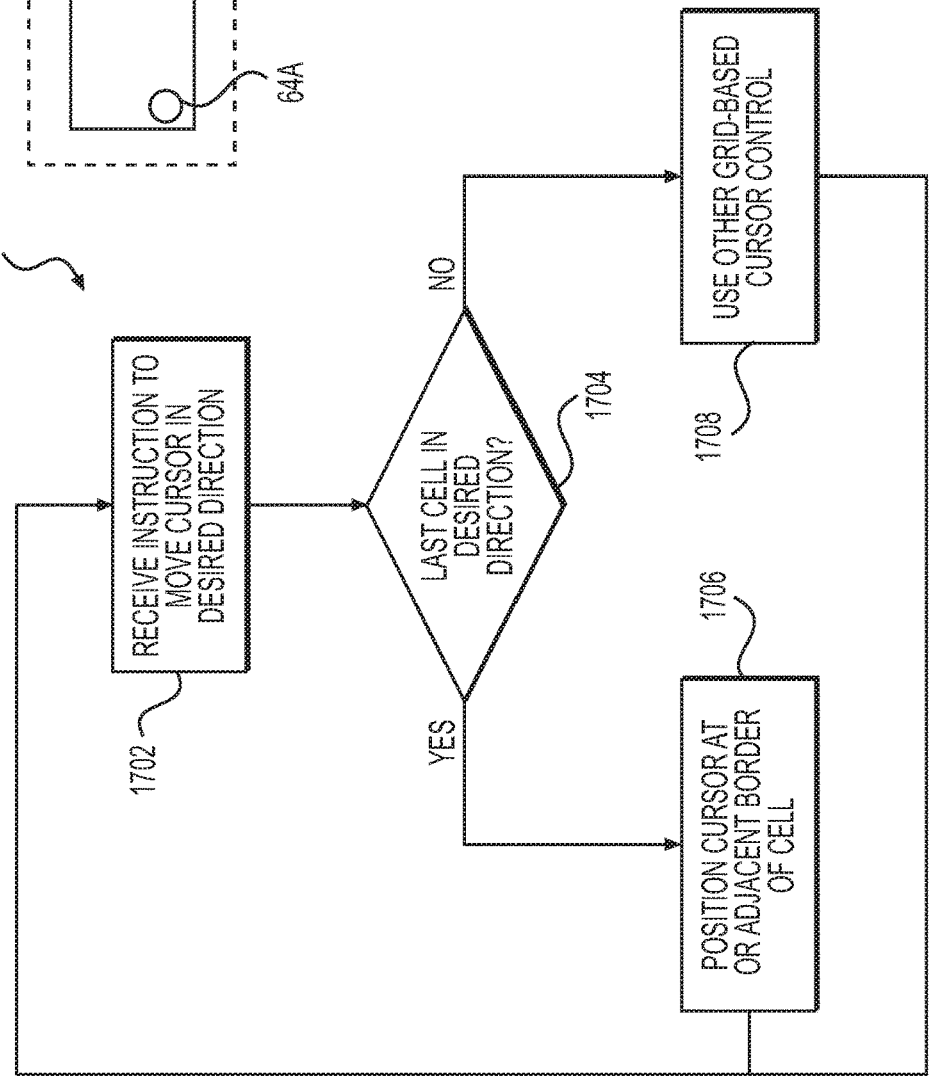
FIG. 17B
FIG. 17A

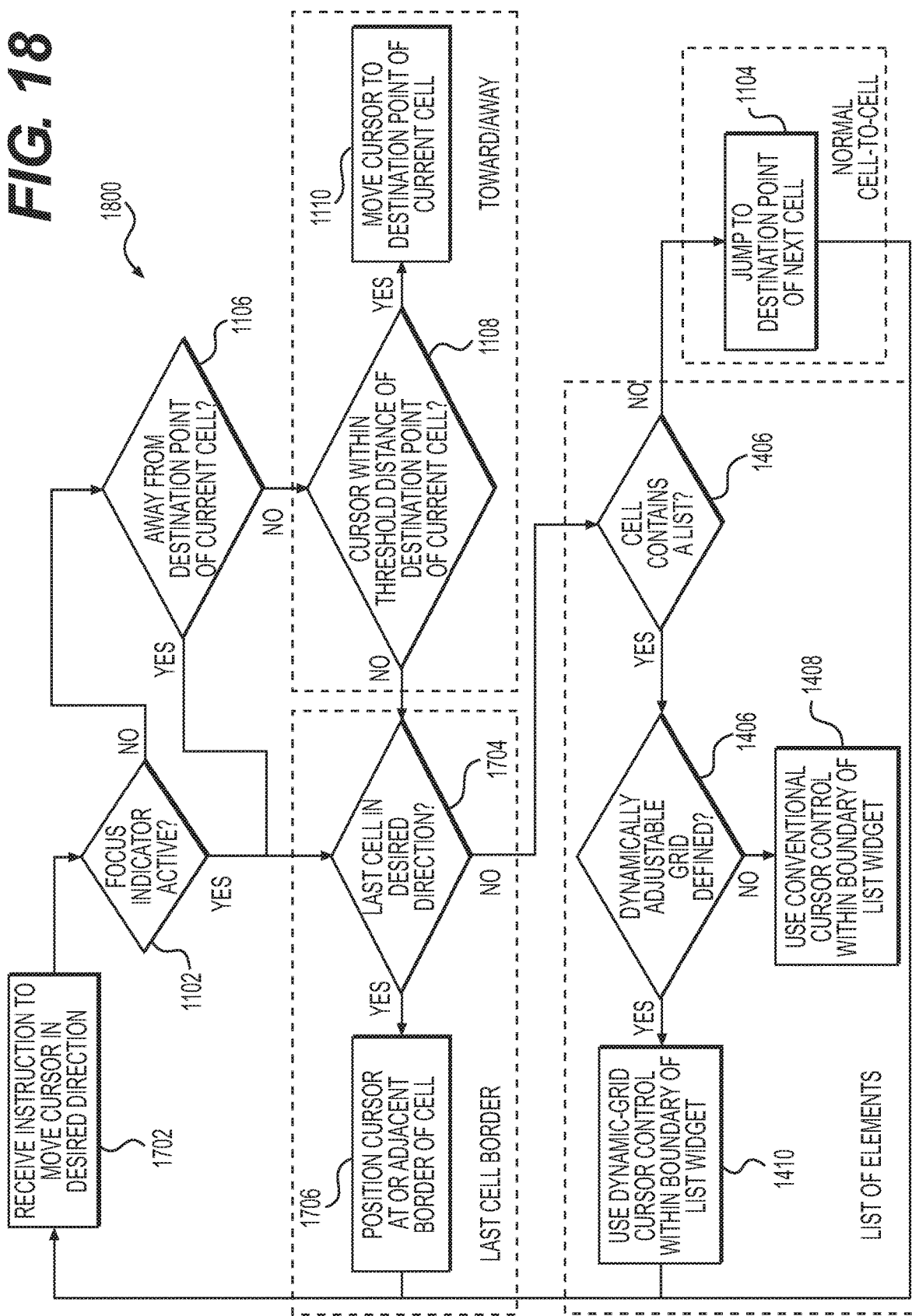

CURSOR CONTROL FOR AIRCRAFT DISPLAY DEVICE

CROSS-REFERENCE TO RELATED APPLICATION

This application is a national phase application under 35 U.S.C. 371 of International Patent Application No. PCT/IB2015/052249 filed on Mar. 26, 2015, which claims priority from U.S. Provisional Patent Application Ser. No. 61/972,501, filed on Mar. 31, 2014, the entire content of which is incorporated herein by reference.

TECHNICAL FIELD

The disclosure relates generally to interaction with aircraft systems and more particularly to the control of a movable cursor on a display device in an aircraft.

BACKGROUND OF THE ART

The use of movable cursors on display devices of aircraft flight decks is known. To provide redundancy, some aircraft provide a primary cursor control device such as a trackball and alternate means of controlling the cursor such as directional movement keys on a keyboard. The directional movement keys may be used when the use of the primary cursor control device may not be practical such as during episodes of turbulence.

Existing methods of controlling the movement of a cursor using directional movement keys can require significant pilot workload due to the concentration and attention required to position the cursor adequately. For example, some methods comprise stepping the cursor by a fixed distance in a desired direction each time a directional movement key is actuated. This can results in a large number of key actuations being required if the fixed distance is small and the target position is far from the initial position of the cursor. Alternatively, if the fixed distance is large and the target is close to the initial position of the cursor, there may be a risk of jumping over the target position. Some existing methods also use slewing of the cursor at a constant speed when a directional movement key is actuated and held. Slewing can take a relatively long time to move a cursor to the desired target when the target position is far and can also require sustained attention of the pilot to achieve adequate positioning of the cursor.

Improvement is therefore desirable.

SUMMARY

The disclosure describes devices, systems, methods and computer program products useful in controlling the movement of a cursor on a display device in an aircraft.

In one aspect, the disclosure describes a system for controlling the movement of a cursor on a display device in an aircraft where the display device provides a display area for displaying a widget and the cursor. The system comprises:
- a data processor and a medium containing machine-readable instructions executable by the data processor and configured to cause the data processor, upon receipt of an instruction signal being generated by an input device in response to an instruction from a user indicative of a desired movement of the cursor in a desired direction in the display area of the display device, to:
  - using a digital representation of a grid defining a plurality of cells overlaying at least a portion of the display area, identify a current cell from the plurality of cells in which the cursor is currently positioned;
  - using the identification of the current cell and the instruction signal, determine a next position of the cursor in the display area; and
  - generate a signal useful in causing the cursor to move to the determined next position in the display area.

The grid defining the plurality of cells may be invisible on the display device.

The input device may comprise a keypad. The input device may comprise a directional movement key.

The machine-readable instructions may be configured to cause the data processor to, using a digital representation of a destination point in the current cell, determine the next position of the cursor in the display area.

The machine-readable instructions may be configured to cause the data processor to, conditioned upon the instruction signal being indicative of desired cursor movement toward the destination point in the current cell, determine the next position of the cursor to correspond to the destination point in the current cell.

The machine-readable instructions may be configured to cause the data processor to: conditioned upon the instruction signal being indicative of desired cursor movement toward the destination point in the current cell, and, conditioned upon a widget inside the current cell having an inactive focus, determine the next position of the cursor to correspond to the destination point in the current cell.

Determining the next position of the cursor to correspond to the destination point in the current cell may be further conditioned upon the cursor being within a threshold distance from the destination point in the current cell. The threshold distance may be a foveal distance associated with a visual field of the user.

The machine-readable instructions may be configured to cause the data processor to, conditioned upon the instruction signal being indicative of desired cursor movement away from the destination point in the current cell, determine the next position of the cursor to be in a next cell adjacent the current cell.

The machine-readable instructions may be configured to cause the data processor to, conditioned upon a widget inside the current cell having an active focus, determine the next position of the cursor to be in a next cell adjacent the current cell. The next position of the cursor may correspond to a destination point in the next cell. The destination point in the next cell may be positioned to prevent at least some obstruction of information displayed in the next cell by the cursor.

The machine-readable instructions may be configured to cause the data processor to, conditioned upon the current cell being the last cell in the display area along the desired direction, determine the next position of the cursor to be adjacent or on a border of the current cell.

Two or more of the plurality of cells may be of different sizes. Two or more of the plurality of cells may each contain a single widget. At least some of the plurality of cells may have a rectangular shape.

The input device may comprise an alternate means of controlling the cursor and the system may further comprise a primary cursor control device.

The widget may comprise a list of items and each item may be contained in a respective cell. The grid may be dynamically adjustable based on the number of items in the list.

In another aspect, the disclosure describes a computer-implemented method for controlling a movable cursor on a display device in an aircraft where the display device defines a display area for displaying a widget and the cursor. The method comprises:

receiving an instruction from a user indicative of a desired movement of the cursor in a desired direction in the display area of the display device;

using a digital representation of a grid defining a plurality of cells overlaying at least a portion of the display area, identifying a current cell from the plurality of cells in which the cursor is currently positioned;

using the identification of the current cell and the instruction from the user, determining a next position of the cursor in the display area; and generating a signal useful in causing the cursor to move to the determined next position in the display area.

The grid defining the plurality of cells may be invisible on the display device.

The instruction from the user may be received via a directional movement key.

The method may comprise using a digital representation of a destination point in the current cell, determining the next position of the cursor in the display area.

The method may comprise: conditioned upon the instruction from the user being indicative of desired cursor movement toward the destination point in the current cell, determining the next position of the cursor to correspond to the destination point in the current cell.

The method may comprise: conditioned upon the instruction from the user being indicative of desired cursor movement toward the destination point in the current cell, and, conditioned upon a widget inside the current cell having an inactive focus, determining the next position of the cursor to correspond to the destination point in the current cell.

Determining the next position of the cursor to correspond to the destination point in the current cell may be further conditioned upon the cursor being within a threshold distance from the destination point in the current cell. The threshold distance may be a foveal distance associated with a visual field of the user.

The method may comprise: conditioned upon the instruction from the user being indicative of desired cursor movement away from the destination point in the current cell, determining the next position of the cursor to be in a next cell adjacent the current cell.

The method may comprise: conditioned upon a widget inside the current cell having an active focus, determining the next position of the cursor to be in a next cell adjacent the current cell. The next position of the cursor may correspond to a destination point in the next cell. The destination point in the next cell may be positioned to prevent at least some obstruction of information displayed in the next cell by the cursor.

The method may comprise: conditioned upon the current cell being the last cell in the display area along the desired direction, determining the next position of the cursor to be adjacent or on a border of the current cell.

Two or more of the plurality of cells may be of different sizes. At least some of the plurality of cells may have a rectangular shape. Two or more of the plurality of cells may each contain a single widget. The widget may comprise a list of items and each item may be contained in a respective cell. The method may comprise dynamically adjusting the grid based on the number of items in the list.

In a another aspect, the disclosure describes a computer program product for controlling a movable cursor on a display device in an aircraft where the display device defines a display area for displaying a widget and the cursor, the computer program product comprising a non-transitory computer readable storage medium containing program code, the program code readable/executable by a computer, processor or logic circuit to perform a method comprising:

receiving an instruction from a user indicative of a desired movement of the cursor in a desired direction in the display area of the display device;

using a digital representation of a grid defining a plurality of cells overlaying at least a portion of the display area, identifying a current cell from the plurality of cells in which the cursor is currently positioned;

using the identification of the current cell and the instruction from the user, determining a next position of the cursor in the display area; and generating a signal useful in causing the cursor to move to the determined next position in the display area.

The grid defining the plurality of cells may be invisible on the display device.

The instruction from the user may be received via a directional movement key.

The method may comprise using a digital representation of a destination point in the current cell, determining the next position of the cursor in the display area.

The method may comprise conditioned upon the instruction from the user being indicative of desired cursor movement toward the destination point in the current cell, determining the next position of the cursor to correspond to the destination point in the current cell.

The method may comprise: conditioned upon the instruction from the user being indicative of desired cursor movement toward the destination point in the current cell, and, conditioned upon a widget inside the current cell having an inactive focus, determining the next position of the cursor to correspond to the destination point in the current cell. Determining the next position of the cursor to correspond to the destination point in the current cell may be further conditioned upon the cursor being within a threshold distance from the destination point in the current cell. The threshold distance may be a foveal distance associated with a visual field of the user.

The method may comprise: conditioned upon the instruction from the user being indicative of desired cursor movement away from the destination point in the current cell, determining the next position of the cursor to be in a next cell adjacent the current cell.

The method may comprise: conditioned upon a widget inside the current cell having an active focus, determining the next position of the cursor to be in a next cell adjacent the current cell.

The next position of the cursor may correspond to a destination point in the next cell. The destination point in the next cell may be positioned to prevent at least some obstruction of information displayed in the next cell by the cursor.

The method may comprise: conditioned upon the current cell being the last cell in the display area along the desired direction, determining the next position of the cursor to be adjacent or on a border of the current cell.

Two or more of the plurality of cells may be of different sizes. At least some of the plurality of cells may have a rectangular shape. Two or more of the plurality of cells each contain a single widget. The widget may comprise a list of items and each item may be contained in a respective cell. The grid may be dynamically adjustable based on the number of items in the list.

In another aspect, the disclosure describes aircraft comprising one or more devices, systems and/or computer program products disclosed herein.

Further details of these and other aspects of the subject matter of this application will be apparent from the detailed description and drawings included below.

DESCRIPTION OF THE DRAWINGS

Reference is now made to the accompanying drawings, in which:

FIG. 2 shows an exemplary cursor control device of the flight deck of FIG. 1;

FIG. 3 shows an exemplary multi-function keypad of the flight deck of FIG. 1;

FIG. 15 shows a cursor located at a border between a first portion of a format where grid-based cursor control is used and a second portion of the format where conventional cursor control is used;

FIGS. 16A-16C show formats having different amounts of the first portion and of the second portion of FIG. 15;

FIG. 17A is a flowchart illustrating a method for controlling the movement of the cursor when a last cell in a desired direction is encountered;

FIG. 17B schematically illustrates the movement of the cursor associated with the method of FIG. 17A; and FIG. 18 is a flowchart incorporating parts of the methods of FIGS. 11, 14 and 17.

DETAILED DESCRIPTION

Aspects of various embodiments are described through reference to the drawings.

The present disclosure describes devices, systems, methods and computer program products useful in controlling the movement of a cursor on a display device. While the present disclosure is mainly directed to display devices of aircraft flight decks, the devices, systems, methods and computer program products described herein could also be used in other applications requiring control of a movable cursor over a display area. For example, the devices, systems, methods and computer program products could be used for controlling cursor movement on displays in other portions of aircraft, of other types of mobile platforms (e.g., vehicles) and also in stationary applications. The devices, systems, methods and computer program products disclosed herein could also be used for, but not limited to, controlling cursor movement on displays associated with aircraft electronic flight bags, aircraft cabin management systems and in-flight entertainment systems.

Figure 1:
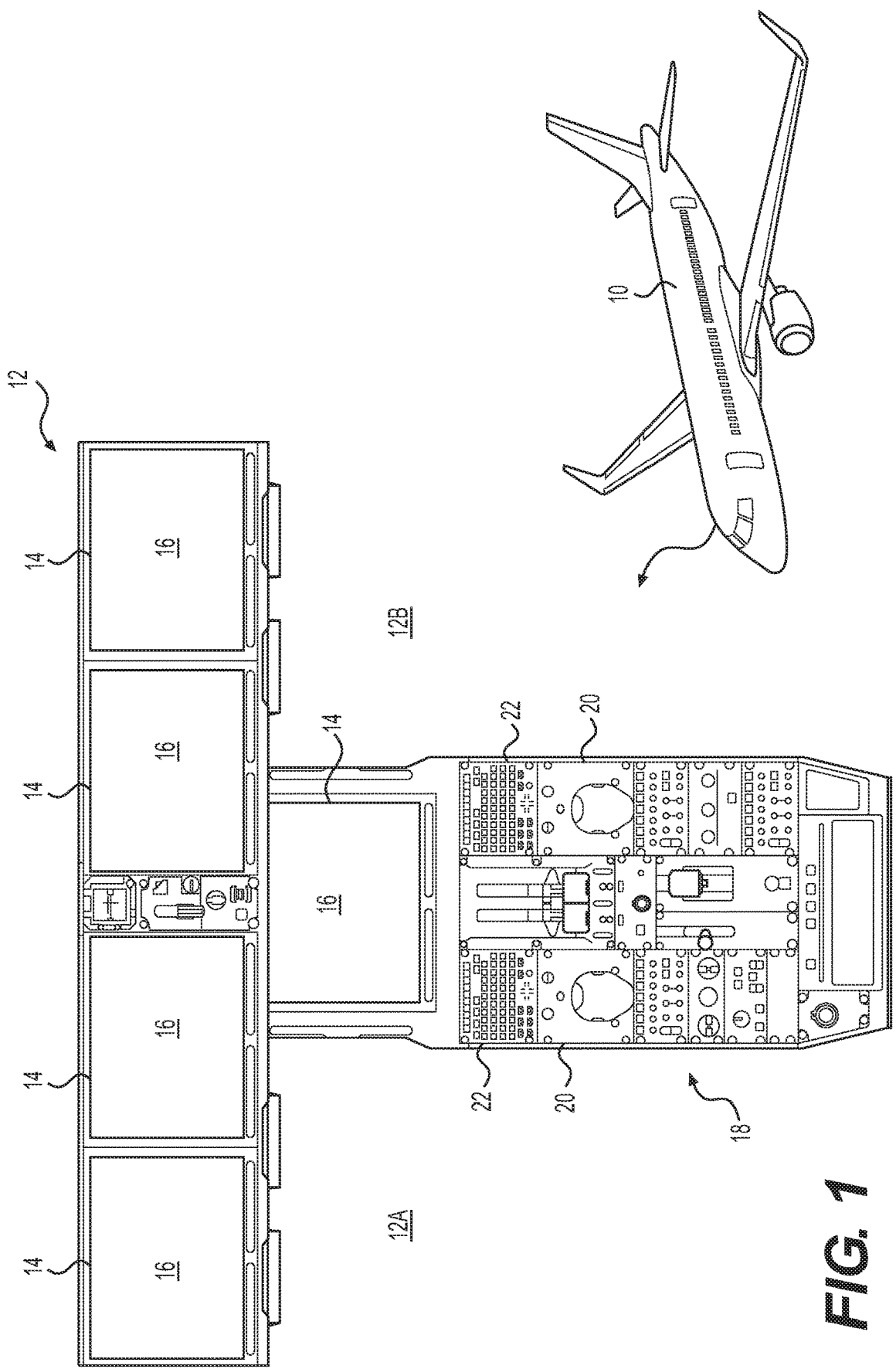
FIG. 1 shows an exemplary aircraft flight deck and a corresponding exemplary aircraft comprising the flight deck.

FIG. 1 shows an exemplary aircraft 10 and a partial schematic representation of flight deck 12 which may be part of aircraft 10. Aircraft 10 may comprise corporate, private, commercial or any other type of aircraft. For example, aircraft 10 may be a fixed-wing aircraft or rotary-wing aircraft. In some embodiments, aircraft 10 may be a narrow-body, twin engine jet airliner. Flight deck 12 may comprise additional elements than those shown and described herein. Flight deck 12 may comprise left portion 12A intended to be used by a pilot (sometimes referred as "captain") of aircraft 10 and right portion 12B intended to be used by a co-pilot (sometimes referred as "first officer") of aircraft 10. Left portion 12A and right portion 12B may comprise functionally identical components so that at least some operational redundancy may be provided between left portion 12A and right portion 12B of flight deck 12.

Flight deck 12 may comprise one or more display devices 14 providing respective display areas 16. In the particular configuration of flight deck 12 shown, left portion 12A and right portion 12B may each comprise two display devices 14 and an additional display device 14 may be provided in pedestal region 18 of flight deck 12. Display device 14 provided in pedestal region 18 may be shared between the pilot and the first officer during normal operation of aircraft 10. Display devices 14 may include one or more cathode-ray tubes (CRTs), liquid crystal displays (LCDs), plasma displays, light-emitting diode (LED) based displays or any known or other type of display device that may be suitable for use in flight deck 12. Display devices 14 may be used to display operational and status information about various systems of aircraft 10, information related to flight/mission planning, maps and any other information that may be useful for the user(s) (e.g., pilot and first officer) during the operation of aircraft 10. Display devices 14 may also permit dialog between the users and various systems of aircraft 10 via suitable graphical user interfaces. For example, as explained below, one or more widgets may be displayed in display areas 16 of display devices 14 and dialog between users and various systems of aircraft 10 via display devices 14 may be achieved at least in part by interacting with the displayed widgets using a cursor movable over one or more of display areas 16. Accordingly, flight deck 12 may comprise one or more user input devices such as one or more cursor control devices 20 (referred hereinafter as "CCD 20") and one or more multi-function keypads 22 (referred hereinafter as "MKP 22").

FIG. 2 shows CCD 20 of flight deck 12. CCD 20 may comprise trackball 24 and one or more confirmation keys 26. Trackball 24 may be used to control the movement of a cursor (shown in FIG. 4) over one or more of display areas 16. Instead of or in addition to trackball 24, CCD 20 could include a trackpad, a touch sensitive screen and/or a joystick for cursor movement. Confirmation keys 26 may be used to select or actuate a widget displayed on one or more of display areas 16 once the cursor has been placed over the widget. In some embodiments, CDD 20 may be considered a primary means of controlling the movement of the cursor over the one or more display areas 16.

FIG. 3 shows MKP 22 of flight deck 12. MKP 22 may comprise display 28, alphanumeric keys 30, directional movement (e.g., arrow) keys 32 and function keys 34, confirmation key 36 labeled "ENTER" and/or other types of keys. Directional movement keys 32 may be used to cause movement of the cursor over one or more of display areas 16. As explained below, directional movement keys 32 may cause discrete movement of the cursor or slewing movement of the cursor. Confirmation key 36 may be used to select or actuate a widget displayed on one or more of display areas 16 once the cursor has been placed over the widget. Directional movement keys 32 may be considered an alternate means of controlling the movement of the cursor over the one or more display areas 16. In some embodiments, directional movement keys 32 may be used any time including when it may not be practical to use CCD 20 such as during episodes of turbulence for example. MKP 22 may provide operational redundancy to CCD 20 and therefor some aspects of the present disclosure may contribute toward reduced dispatch interruption rates of an associated aircraft.

Figure 4:
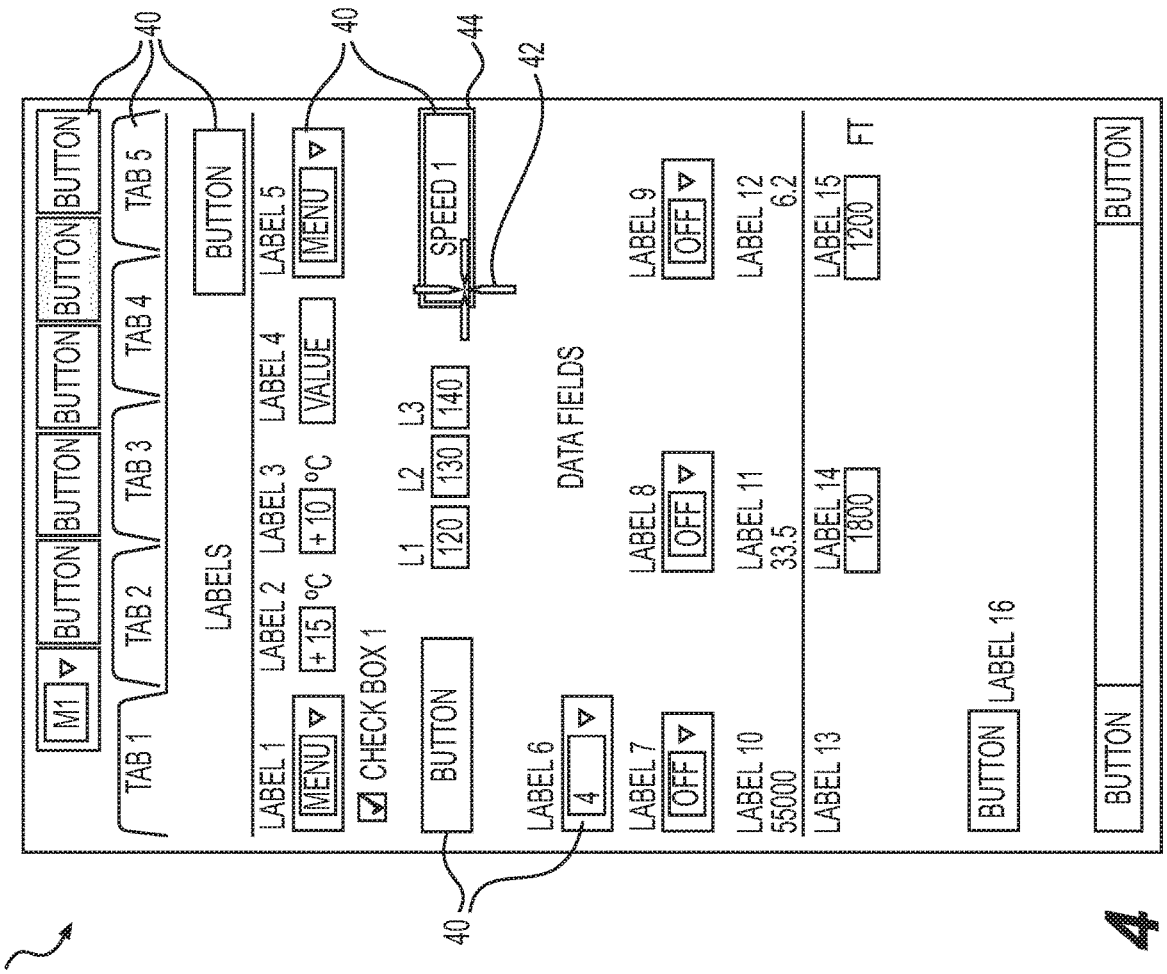
FIG. 4 shows an exemplary format displayed on a display device of the flight deck of FIG. 1.

FIG. 4 shows an exemplary format 38 that may be displayed on one or more display areas 16 of display devices 14 of flight deck 12. Format 38 may comprise one or more widgets 40. Widgets 40 may include interactive objects or non-interactive (e.g., display-only) objects. For example, widgets 40 may include buttons, icons, tabs, scroll bars, hyperlinks, radio buttons, check boxes, editable data fields, lists of selectable items, pull-down menus, display-only text and/or graphic fields and/or any other objects suitable for use in graphical user interfaces. FIG. 4 also shows an exemplary cursor 42. Cursor 42 may be movable over some or all of format 38. Similarly, cursor 42 may be movable over one or more of display areas 16. The movement of cursor 42 may be controlled by a user via CCD 20 and/or directional movement keys 32 of MKP 22. In various embodiments, the shape, size and configuration of cursor 42 may be different than that shown herein.

In FIG. 4, cursor 42 is positioned over a specific widget 40 which is labelled "SPEED 1" and consequently, this widget 40 is shown as having an active focus indicator 44. The active focus indicator 44 provides a visual indication to the user that cursor 42 is over that particular widget 40 and that the actuation of confirmation keys 26 or 36 will cause the particular widget 40 to be selected or actuated. The visual indication provided by focus indicator 44 may include a highlighted border around widget 40 labelled "SPEED 1". In various embodiments, other types of focus indicators 44 may be used to provide a visual indication to the user as to which of widgets 40 will be selected or actuated if any one of confirmation keys 26 and 36 is actuated.

Figure 5A:
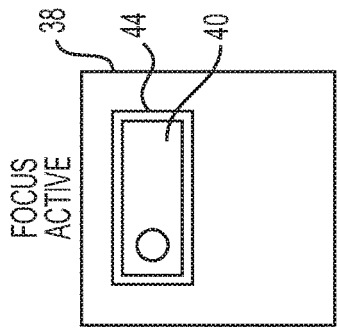
FIGS. 5A and 5B respectively show schematic representations of a widget with an active focus indicator and an inactive focus indicator.
Figure 5B:
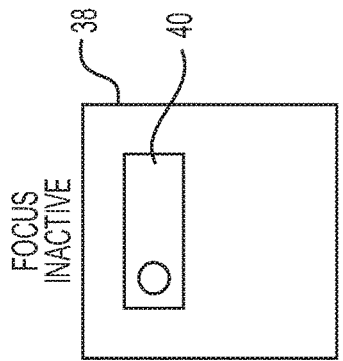

FIGS. 5A and 5B respectively show schematic representations of an exemplary widget 40 with an active focus indicator 44 and an inactive focus indicator 44.

Figure 6:
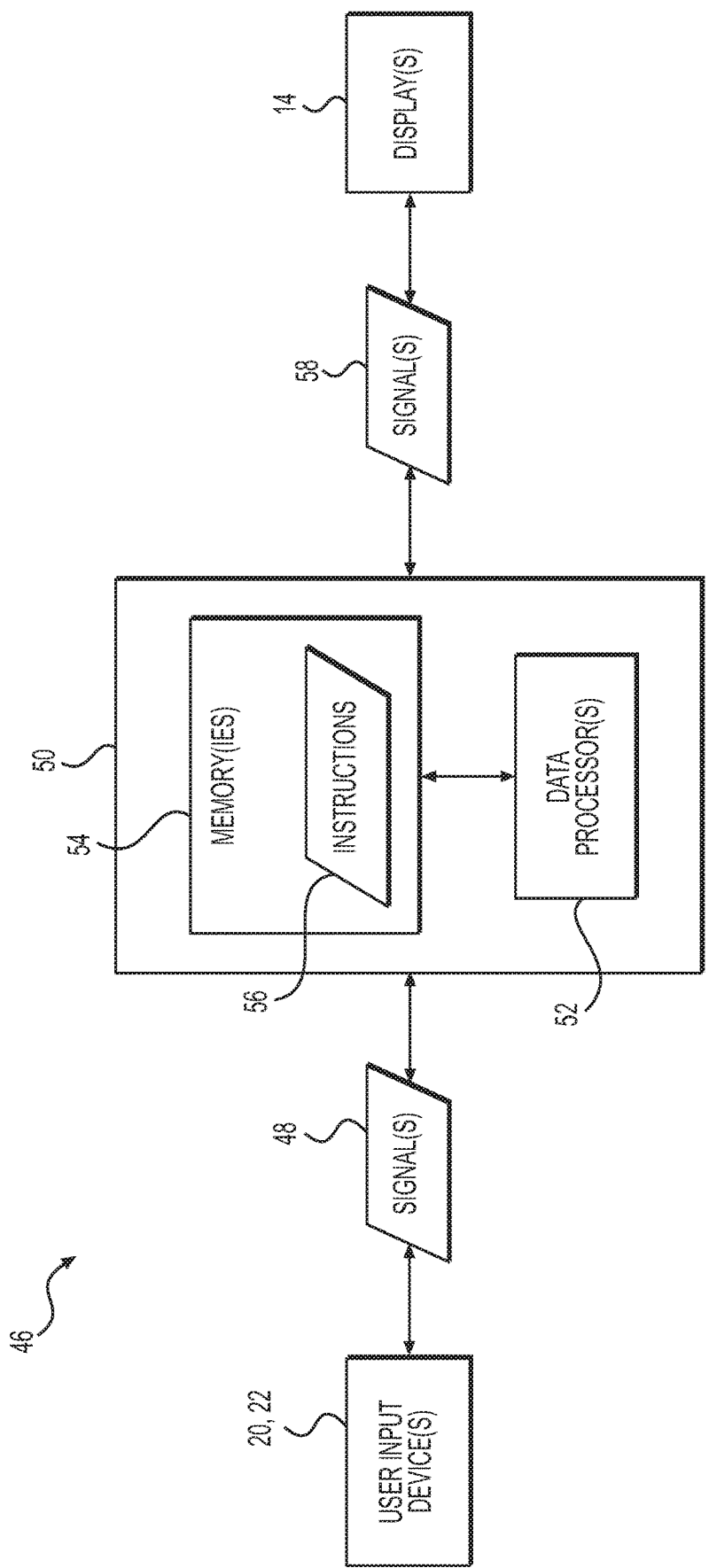
FIG. 6 shows an exemplary system for controlling the movement of a cursor on a display device in the aircraft of FIG. 1.

FIG. 6 shows an exemplary system 46 for controlling the movement of cursor 42 on at least one display device 14 of flight deck 12 where display device(s) 14 provides display area(s) 16 for displaying one or more widgets 40 and one or more cursors 42. In some embodiments, more than one cursor 42 may be displayed on one or more of display areas 16. For example, one cursor 42 may be associated with and be controllable by the pilot and another cursor 42, which may have a different appearance, may be associated with and be controllable by the first officer. System 46 may comprise one or more input devices (e.g., CCD 20 and/or MKP 22) configured to receive an instruction from a user indicative of desired movement of cursor 42 in a desired direction in display area 16 of display device 14 and generate one or more corresponding instruction signals 48. In various embodiments, input devices 20, 22 may comprise directional movement keys 32 of MKP 22. System 46 may also comprise one or more computers 50 (referred hereinafter as "computer 50") operatively coupled to display device 14 and to the user input device 20, 22. Computer 50 may comprise one or more data processors 52 (referred hereinafter as "data processor 52") and a storage medium or media 54 (referred hereinafter as "memory 54") containing machine-readable instructions 56 executable by data processor 52 and configured to cause data processor 52, based on instruction signal 48 from input device 20, 22, to generate one or more signals 58 (referred hereinafter as "output signal 58") useful in causing cursor 42 to move to a determined next position in display area 16 of display device 14.

Computer 50 may be part of an avionics suite of aircraft 10. For example, in some embodiments, computer 50 may have additional functions including the management of one or more graphic user interfaces of flight deck 12 and/or other part(s) of aircraft 10. In various embodiments, computer 50 may comprise more than one computer or data processors where the methods disclosed herein (or parts thereof) could be performed in parts using a plurality of computers or data processors, or, alternatively, be performed entirely using a single computer or data processor. In some embodiments, computer 50 could be physically integrated with (e.g., embedded in) display device 14.

Various aspects of the present disclosure may be embodied as systems, methods and/or computer program products. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present disclosure may take the form of a computer program product embodied in one or more non-transitory computer readable medium(ia) (e.g., memory 54) having computer readable program code (e.g., machine-readable instructions 56) embodied thereon. The computer program product may, for example, be executed by a computer, processor or other suitable logic circuit to cause the execution of one or more methods disclosed herein in entirety or in part. For example, such computer program product may comprise computer readable program code for execution by computer 50 shown in FIG. 6.

Any combination of one or more computer readable medium(ia) may be utilized. For example, memory 54 may comprise computer readable signal medium or a non-transitory computer readable storage medium. Memory 54 may comprise non-transitory computer readable storage medium such as, for example, but not limited to, an electronic, magnetic, optical, electromagnetic, infrared, or semiconductor system, apparatus, or device, or any suitable combination of the foregoing. More specific examples (a non-exhaustive list) of memory 54 would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present disclosure, memory 54 may comprise any tangible medium that can contain, or store a program for use by or in connection with system 46. While memory 54 is illustrated in FIG. 6 as being part of computer 50, instructions 56 may be stored elsewhere and be otherwise be accessible to data processor 52. For example, program code comprising instructions 56 and embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure in accordance with instructions 56 may be written in any combination of one or more programming languages, including an object oriented programming language such as Java, Smalltalk, C++ or the like and conventional procedural programming languages, such as the "C" programming language or other programming languages. Such program code may be execute entirely or in part by computer 50 or other data processing device(s).

Output signal 58 from computer 50 may be indicative of the determined next position of cursor 42 in display area 16 and accordingly may be transmitted to display device 14 via suitable means. The determination of the next position of cursor 42 may be made based on machine-readable instructions 56 stored in memory 54. The determination of the next position of cursor 42 may be made in accordance with one or more methods described herein.

Figure 7:
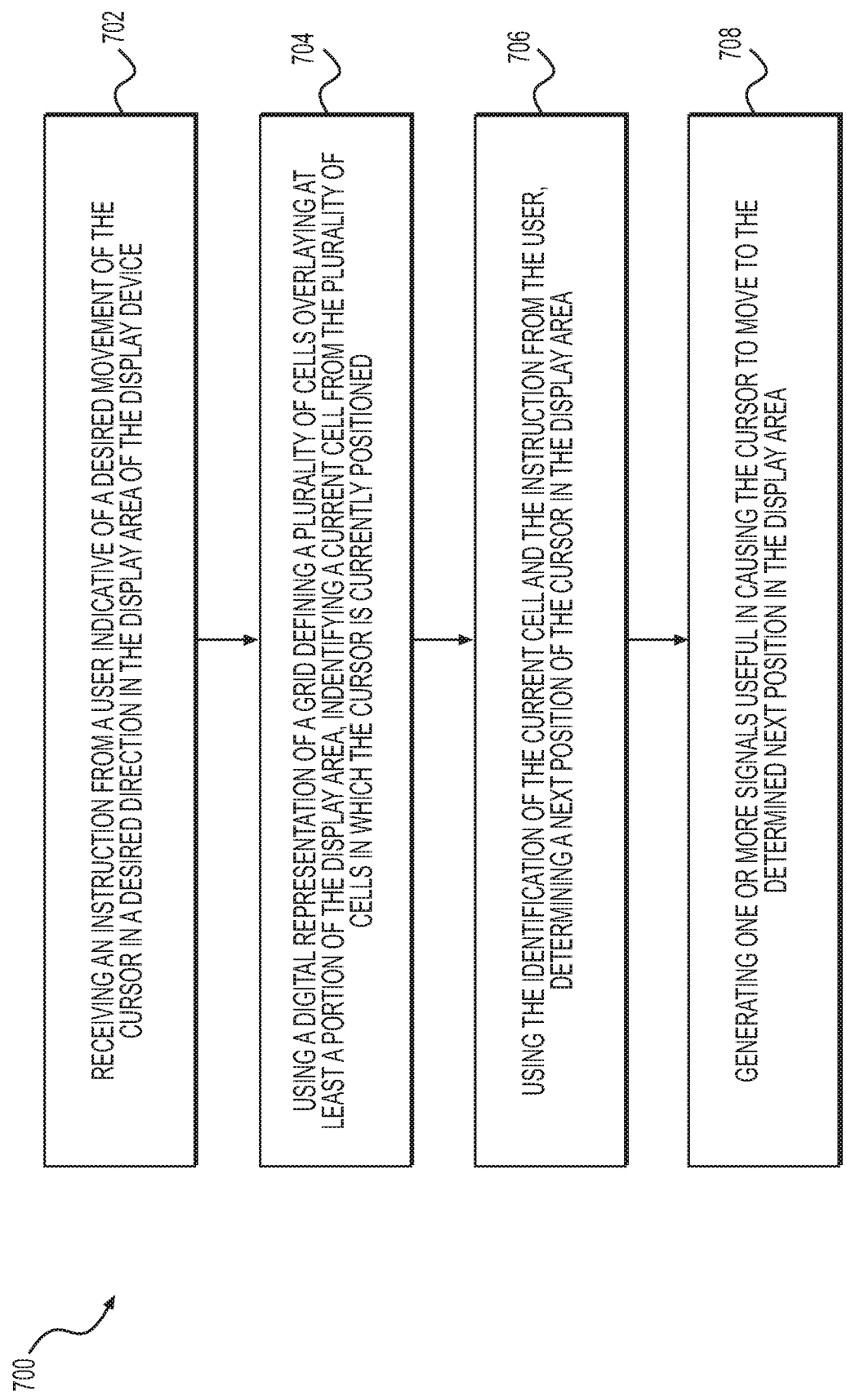
FIG. 7 is a flowchart of an exemplary method for determining a next position of the cursor.

FIG. 7 is a flowchart of an exemplary method 700 for determining a next position of cursor 42. Method 700 may be executed in entirety or in part using computer 50 based on machine-readable instructions 56. Method 700 may comprise: receiving an instruction from a user indicative of desired movement of cursor 42 in a desired direction in display area 16 of display device 14 (see block 702); using a digital representation of a grid defining a plurality of cells overlaying at least a portion of display area 16, identifying a current cell from the plurality of cells in which cursor 42 is currently positioned (see block 704); using the identification of the current cell and the instruction from the user, determining a next position of cursor 42 in display area 16 (see block 706); and generating one or more signals 58 useful in causing cursor 42 to move to the determined next position in display area 16.

Figure 8:
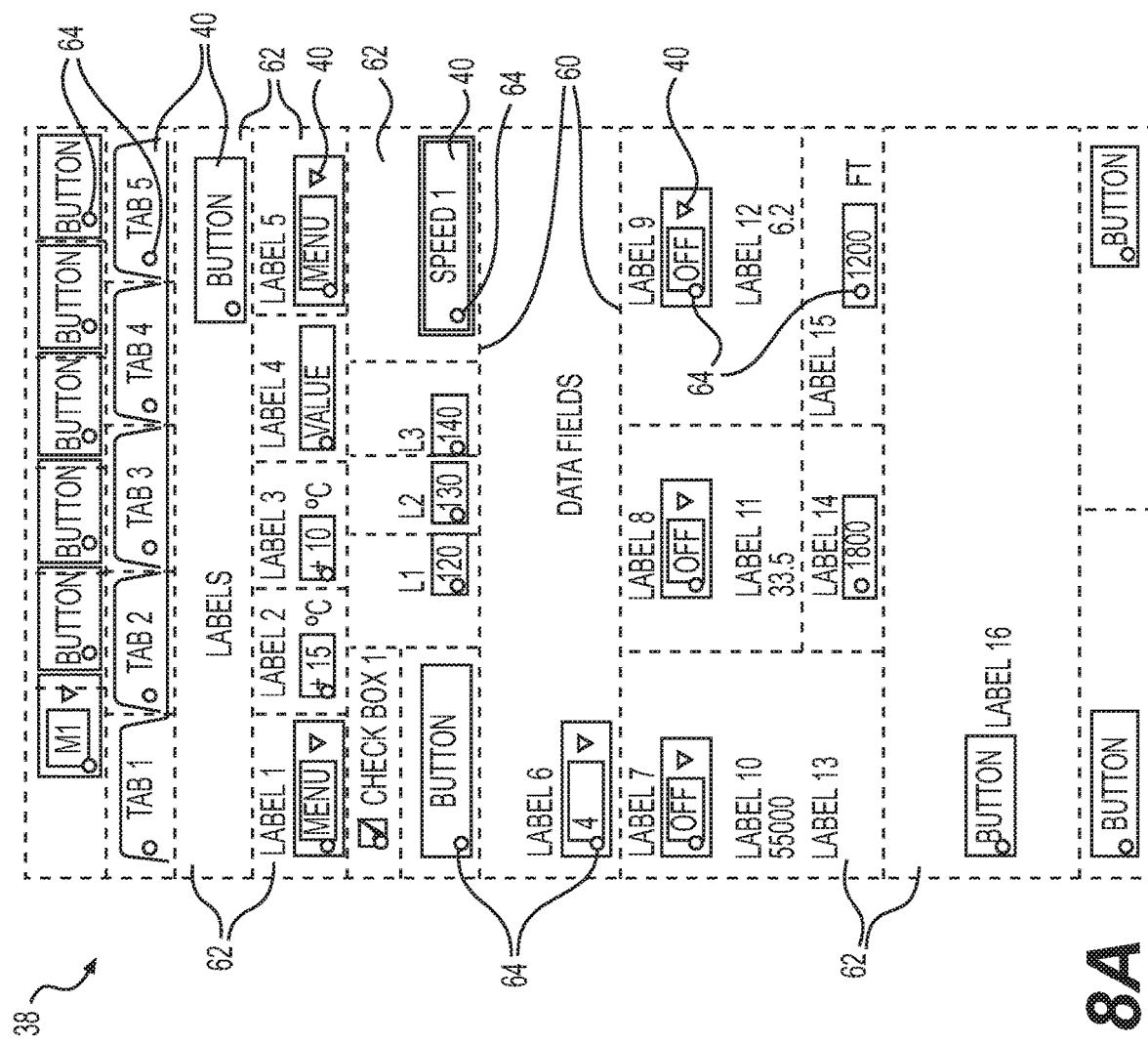
FIG. 8A shows the format of FIG. 4A with a grid overlaying the format.
FIG. 8B shows an exemplary representation of a cell defined by the grid of FIG. 8A.
FIG. 8C shows an exemplary destination point within the cell of FIG. 8B.

FIG. 8A shows format 38 of FIG. 4 with an exemplary representation of grid 60 from method 700 overlaying format 38. Grid 60 may define a plurality of cells 62 overlaying format 38. FIG. 8B shows an exemplary representation of cell 62 defined by grid 60 of FIG. 8A. Grid 60 may be embodied as a digital representation of a grid that divides the area of format 38 into smaller regions (i.e., cells 62). Accordingly, the digital representation of grid 60 may be stored in memory 54 and used by computer 50 to determine a next position of cursor 42. Even though grid lines are shown in FIG. 8A, these are shown for illustration purpose only. In various embodiments, grid 60 may not be displayed on display device 14 and accordingly may be invisible to the user. Accordingly, grid 60 may in some embodiments be used in virtual form only. The digital representation of grid 60 may be predetermined and stored in memory 54 so that it may be used by computer 50 as needed. For example, grid 60 may be associated with a specific format 38 and therefore different layouts of grids 60 may be used for different formats 38. Accordingly, a plurality of digital representations of different grids 60 may be stored in memory 54 and used with different corresponding formats 38 that may be displayed by display device 14. In some embodiments, grid 60 could be generated at run-time (e.g., automatically according to one or more rules).

Grid 60 may define cells 62 of different sizes and/or shapes depending on the layout of format 38 and may define a non-regular grid pattern. For example, grid 60 may define cells 62 of generally rectangular, four-sided shape. However, other cell shapes (e.g., polygons) may also be used instead of or in addition to a rectangular shape. The size of each cell 62 may also be selected based on the contents of each cell 62 on format 38. For example, the size and shape of each cell 62 may be selected based on how many widgets 40 are located inside a particular cell 62 and also on the type(s) of widget(s) 40. Accordingly, grid 60 may define a plurality of cells 62 of uniform size or of different sizes. For example, two or more of the plurality of cells 62 may be of different sizes. Similarly, grid 60 may define a plurality of cells 62 of uniform shape or of different shapes. In some embodiments, at least some of the plurality of cells 62 may have a rectangular shape.

Each cell 62 may contain one or more widgets 40 and/or contain blank space(s) in format 38. The content, size and shape of each cell 62 may be predetermined based on the contents of the associated format and/or on a desired cursor navigation pattern within the format. In some embodiments, one or more cells 62 may contain a single widget 40 and/or one or more cells 62 may contain a plurality of widgets 40. In various embodiments, the methods disclosed herein may be used to cause discrete movement of cursor 42 from cell 62 to cell 62 by the actuation of one of directional movement keys 32 irrespective of the contents of cells 62. In cases where two or more adjacent cells 62 may each contain a single widget 40, such cell-to-cell movement may appear to the user as widget-to-widget movement similar to a tabbing behavior. However, contrary to conventional tabbing behavior, no predetermined (e.g., cyclic) tabbing order may be used and the direction of movement of cursor 42 may instead be determined based on which of the directional movement keys 32 is actuated.

FIG. 8C shows an exemplary destination point 64 within cell 62. As also shown in FIG. 8A, one or more cells 62 may each have a predetermined destination point 64. Destination point 64 may also be referenced as a hot spot and may represent an initial (e.g., jump to) position of cursor 42 when cursor 42 arrives in cell 62. For example, when cursor 42 is instructed to move from one cell 62 to another cell 62, the point of arrival of cursor 42 in the other cell 62 may correspond to destination point 64. In some embodiments, each cell 62 may comprise a destination point 64. Destination point 64 may be selected based on the content of a particular cell 62. For example, destination point 64 may be selected to coincide with a widget 40 within cell 62 so that cursor 42 may arrive on top of widget 40. Accordingly, in some embodiments, the arrival of cursor 42 at destination point 64 of cell 62 may consequently (e.g., and automatically) cause cursor 42 to arrive on top of widget 40 and thereby cause the associated widget 40 to have an active focus indicator 44.

Destination points 64 associated with grid 60 may also be stored in memory 54. Like grid 60, destination points 64 may be used in digital form only by computer 50 and may not be displayed on display device 14. Accordingly, destination points 64 may also be invisible to the user.

The layout and configuration of grid 60 and destination points 64 may be selected to facilitate movement of cursor 42 over format 38 using directional movement keys 32 of MKP 22. For example, the layout and configuration of grid 60 and destination points 64 and the underlying logic may be defined so that cursor 42 may follow a logical visual flow for the user when the operator gazes at cursor 42 while also preserving the user's visual momentum by guiding movement of cursor 42 in a predictable manner. In some embodiments for example, each actuation of a directional movement key 32 may result in discrete cell-to-cell movement of cursor 42 in the desired direction and consequently may appear to the user as widget-to-widget movement in the desired direction. Such widget-to-widget movement of cursor 42 using directional movement keys 32 and based on grid 60 may alleviate some user (e.g., pilot) workload in episodes of turbulence in comparison with using CCD 20.

Figure 9:
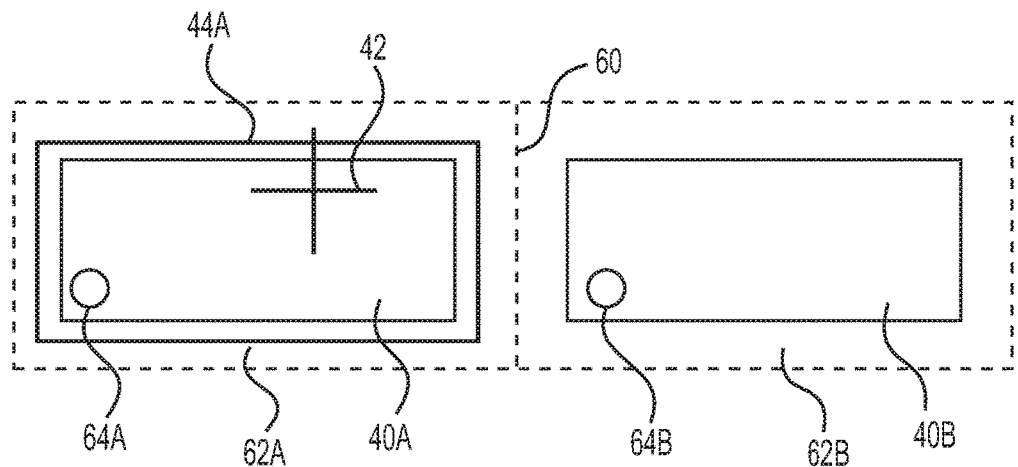
FIG. 9 shows a current cell in which the cursor is currently positioned and an adjacent cell.

FIG. 9 shows current cell 62A in which cursor 42 is currently positioned and an adjacent cell 62B. Adjacent cell 62B may be a next or destination cell requested by the user via CCD 20 or one of directional movement keys 32 (e.g., right arrow key). Widget 40A of current cell 62A is shown as having an active focus indicator 44A since cursor 42 is positioned over widget 40A. The movement of cursor 42 from current cell 62A to next cell 62B may depend on the current position of cursor 42 within current cell 62A. In various embodiments, the methods disclosed herein may be used to determine whether cursor 42 will be moved to: (1) the position of destination point 64A of current cell 62A; (2) the position of destination point 64B of next cell 62B; or (3) at or near a border of current cell 62A if, for example, current cell 62A is the last cell in the direction of cursor movement requested by the user.

Using the current position of cursor 42 and instruction signal 48 from input device 20, 22, methods disclosed herein may, for example, determine whether the intention of the user may be to move cursor 42 toward or away from destination point 64A of current cell 62A. If it is determined that cursor 42 is intended to be moved toward current destination point 64A, then cursor 42 may be moved to current destination point 64A. Alternatively, if it is determined that cursor 42 is intended to be moved away from current destination point 64A, then cursor 42 may be moved to destination point 64B of next cell 62B.

Figure 10:
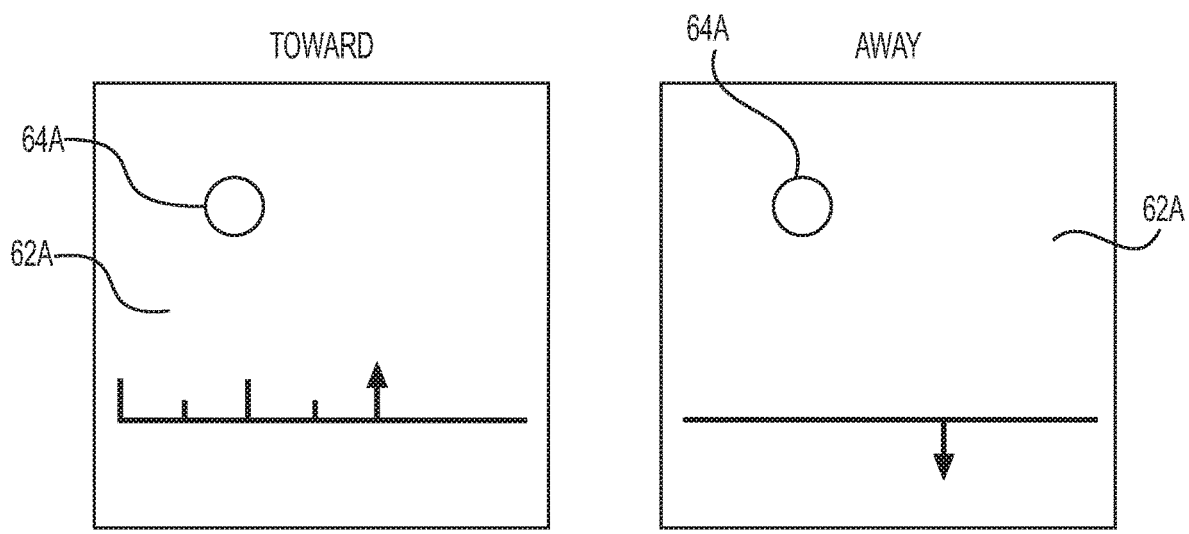
FIG. 10 show schematic representations of moving the cursor toward and away from a destination point of a cell.

FIG. 10 show schematic representations of moving cursor 42 toward or away from current destination point 64A of current cell 62A.

Figure 11:
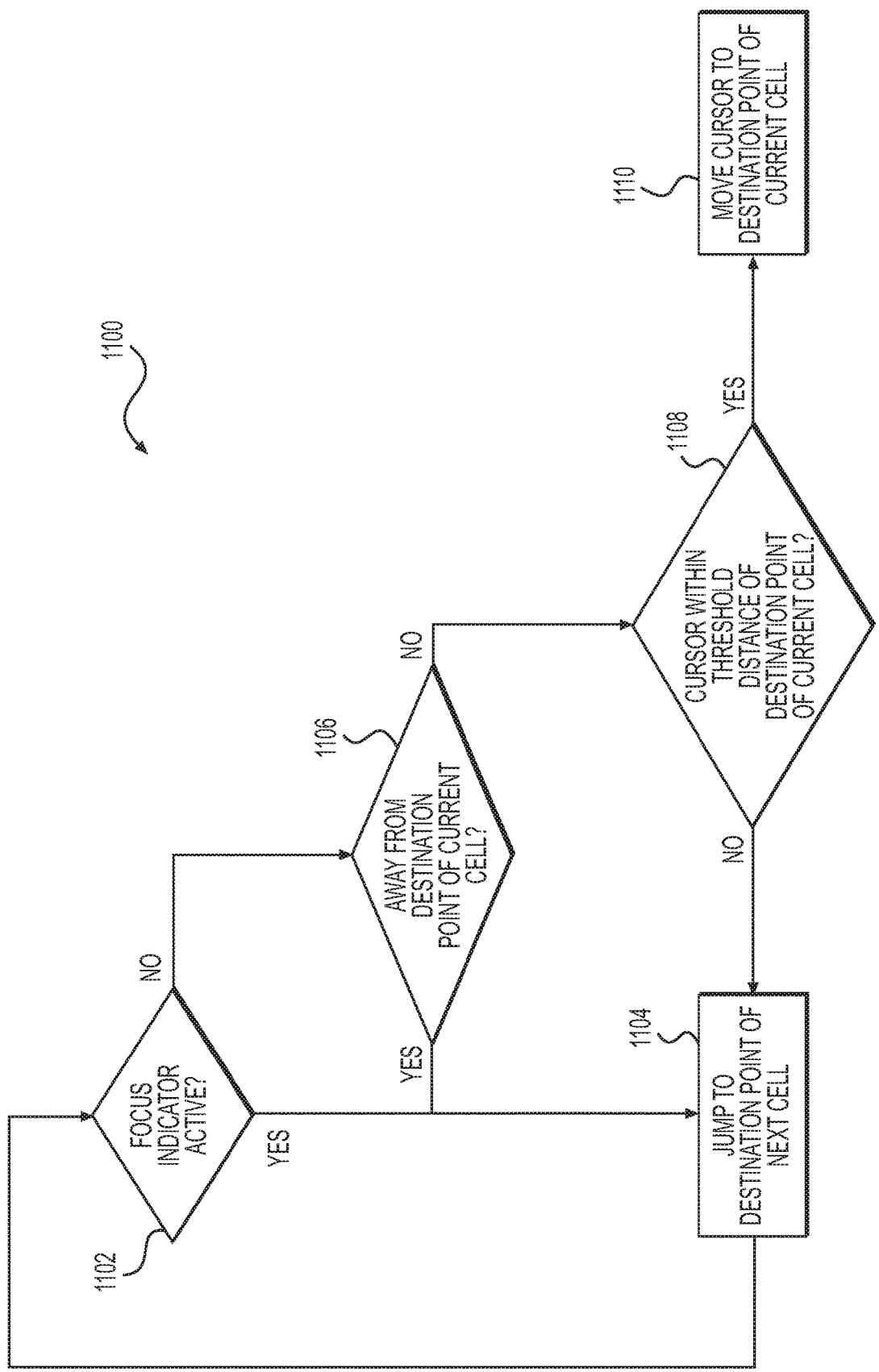
FIG. 11 is a flowchart illustrating an exemplary method for controlling the movement of the cursor on a display device in the aircraft of FIG. 1.

FIG. 11 is a flowchart of an exemplary method 1100 for controlling the movement of cursor 42 on display device 14 of aircraft 10. Method 1100 may be part of method 700. Method 1100 may be executed in entirety or in part using computer 50 based on machine-readable instructions 56. Method 1100 may be used to determine a next position of cursor 42 based on instruction signal 48 indicative of desired movement of cursor 42 in a desired direction by the user. In various embodiments, it may be determined whether focus indicator 44 of widget 40A in current cell 62A (see FIG. 9) has an active or inactive focus indicator 44 at decision block 1102. If focus indicator 44 of widget 40A is active, any instruction from the user to move cursor 42 may be interpreted as an intention to move cursor 42 away from current widget 40A. Accordingly, if focus indicator 44 of widget 40A is active, the receipt of instruction signal 48 may cause cursor 42 to be repositioned (e.g., jump) to destination point 64B in next cell 62B (see block 1104). In other words method 1100 may comprise, conditioned upon widget 40A inside current cell 62A having an active focus indicator 44A, determining the next position of cursor 42 to be in next cell 62B adjacent current cell 62A.

If at block 1102, it is determined that focus indicator 44A is inactive, then one or more further checks may be conducted to determine the intention of the user with respect to desired movement of cursor 42. For example, it may be determined at decision block 1106 whether instruction signal 48 would result in cursor 42 being moved toward or away from destination point 64A of current cell 62A as explained above. If it is determined that cursor 42 is intended to be moved away from destination point 64A of current cell 62A, then such determination may cause cursor 42 to be repositioned (e.g., jump) to destination point 64B in next cell 62B (see block 1104). Accordingly, in some embodiments method 1100 may comprise, conditioned upon instruction signal 48 being indicative of desired cursor movement away from destination point 64A in current cell 62A, determining the next position of cursor 42 to be in next cell 62B adjacent current cell 62A. In some embodiments, the above conclusion may be reached whether or not focus indicator 44 is active or inactive.

At decision block 1106, if it is determined that cursor 42 is intended to be moved toward destination point 64A of current cell 62A, then such determination may cause cursor 42 to be repositioned (e.g., jump) to destination point 64A in current cell 62A (see block 1110). Accordingly, in some embodiments method 1100 may comprise, conditioned upon instruction signal 48 being indicative of desired cursor movement toward destination point 64A in current cell 62A, determining the next position of cursor 42 to correspond to destination point 64A in current cell 62A. In some embodiments, the above conclusion may be reached whether or not focus indicator 44 is active or inactive. Therefore, in some embodiments method 1100 may comprise, conditioned upon instruction signal 48 being indicative of desired cursor movement toward destination point 64A in current cell 62A, and, conditioned upon widget 40A inside current cell 62A having an inactive focus indicator 44A, determining the next position of cursor 42 to correspond to destination point 64A in current cell 62A.

Even though it may be determined at decision block 1106 that cursor 42 is intended to be moved toward destination point 64A of current cell 62A, one or more checks may be made to confirm the intention of the user. For example, it may be determined whether the current position of cursor 42 is within a threshold distance from current destination point 64A of current cell 62A and/or from widget 40A in current cell 62A (see block 1108). The threshold distance may be determined based on a foveal distance associated with a visual field of a typical user. In some embodiments, the threshold distance may be selected to be about 2.5 cm (1 inch). The expectations of the user may be linked to what the user is able to perceive. Accordingly, when inferring if the user wants to move cursor 42 toward widget 40A (or destination point 64a) within current cell 62A, it may be desirable in some cases to limit from which position this action is desirable from a user's perspective. Since the human visual system has clear vision only in the region of the fovea, corresponding approximately to a circle 66 (shown in FIG. 12) of about 5 cm or 2 inches in diameter at a typical distance between the user's eyes and display device 14, a lateral distance of about 2.5 cm or 1 inch each side of cursor 42 and perpendicular to the desired movement direction may be used as a threshold distance for determining whether the user wants to reach widget 40A within current cell 62A or wants to move cursor 42 out of current cell 62A. This limitation of authority may in some cases prevent large and unintended movements of cursor 42.

Accordingly, if the desired movement of cursor 42 is determined to be toward destination point 64A of current cell 62A and destination point 64A (or associated widget 40A) is within the threshold distance from cursor 42, then such determination may cause cursor 42 to be repositioned (e.g., jump) to destination point 64A in current cell 62A (see block 1110). Alternatively, if the desired movement of cursor 42 is determined to be toward destination point 64A of current cell 62A and destination point 64A (or associated widget 40A) is beyond the threshold distance from cursor 42, then such determination may cause cursor 42 to be repositioned (e.g., jump) to destination point 64B in next cell 62B (see block 1110). In this last scenario, since destination point 64A of current cell 62A, may be beyond the threshold distance (e.g., outside of the visual field of the user), it may be determined that the user did not intend to move cursor 42 toward destination point 64A of current cell 62A. Accordingly, determining of the next position of cursor 42 to correspond to destination point 64A in current cell 62A may further be conditioned upon cursor 42 being within the threshold distance from destination point 64A in current cell 62A.

When the next position of cursor 42 is determined to be in next cell 62B, that next position may coincide with the position of destination point 64B of next cell 62B. Even though next cell 62B is illustrated herein as being to the right of current cell 62A, the present disclosure is intended to encompass similar cursor behavior in other directions (e.g., left, up and down) depending on the layout of grid 60 and also depending on which of directional movement keys 32 is actuated.

The location of destination points 64 in each cell 62 may be selected based on widget(s) 40 that are located in a cell 62 and also based on the shape and size of cursor 42. For example, the location destination points 64 may be selected so that when cursor 42 is located at destination point 64, cursor 42 will not significantly obstruct information displayed either on widget 40 or elsewhere within the associated cell 62. For example, as shown in FIG. 8A, destination point 64 on widget 40 labelled "SPEED 1" may be located near a lower right-hand corner of widget 40 so that when cursor 42 is located at destination point 64 of that widget 40, the text "SPEED 1" may still be discernible to the user as shown in FIG. 4. Accordingly, the location of destination points 64 may be selected to prevent at least some obstruction of information displayed in the associated cell 62 by cursor 42.

Figure 12:
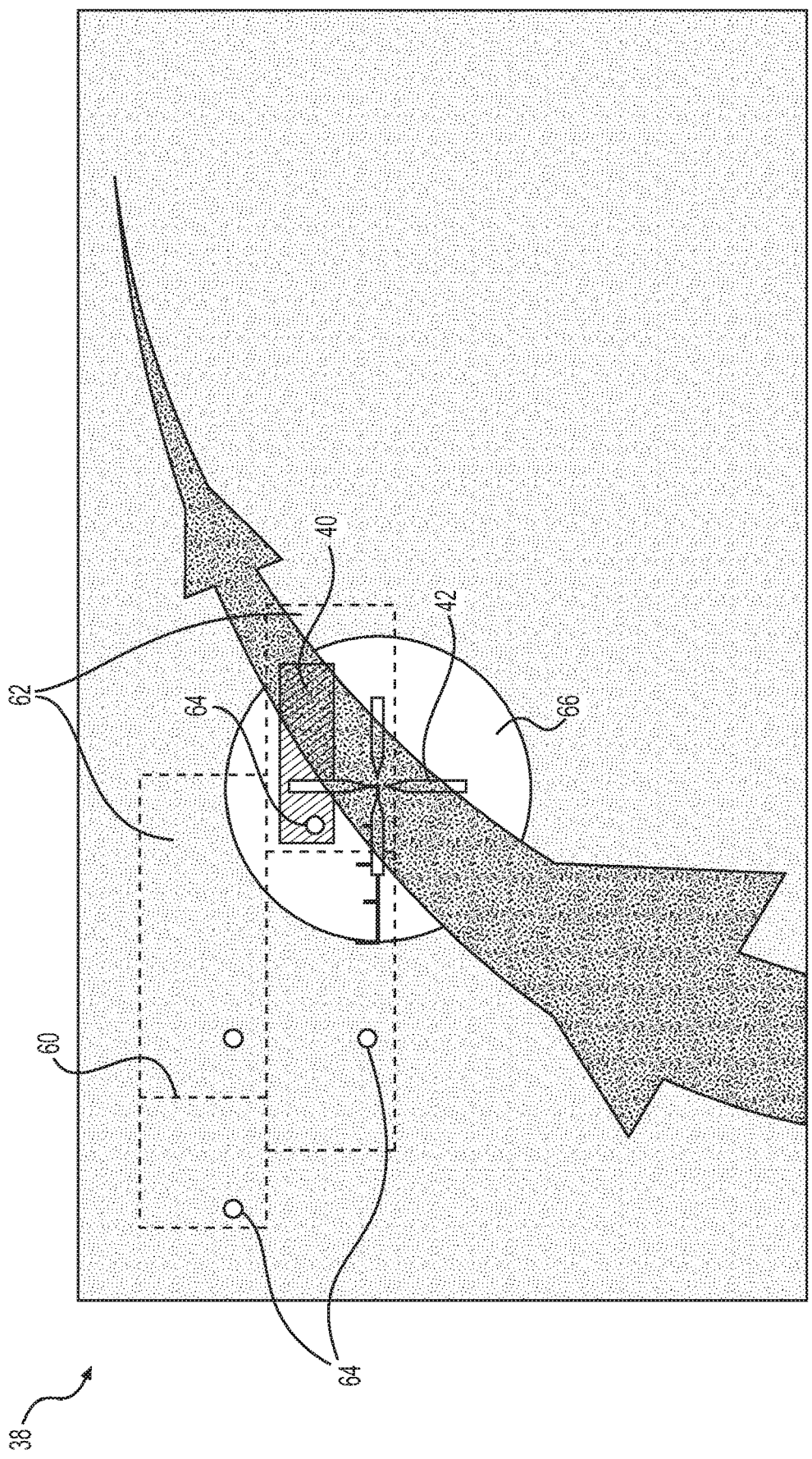
FIG. 12 shows an exemplary portion of a format and a representation of a foveal distance associated with a visual field of the user.

FIG. 12 shows an exemplary portion of format 38 showing circle 66 as a representation of the area of format 38 in which the human visual system may have clear vision when gazing at cursor 42 at a typical distance between the user's eyes and display device 14. The diameter of circle 66 may be based on the foveal distance associated with a visual field of a typical user.

Figure 13:
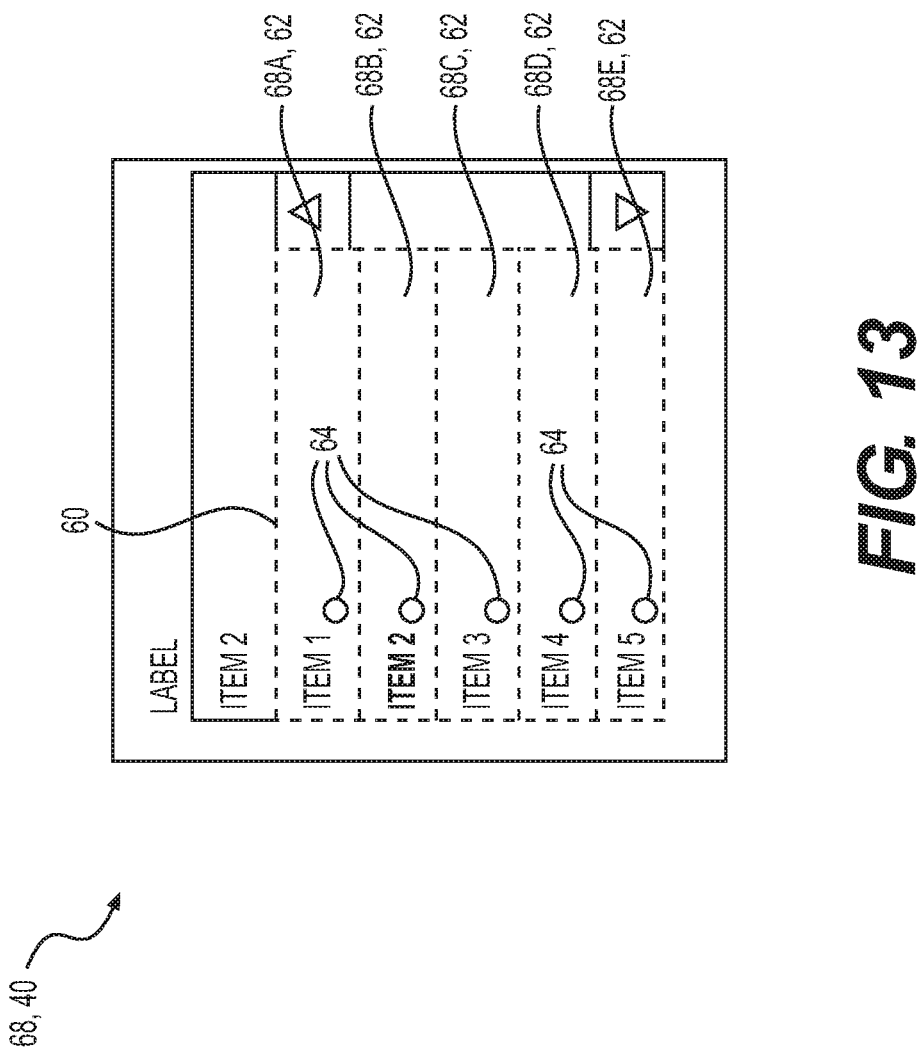
FIG. 13 shows an exemplary list comprising elements contained in respective cells.

FIG. 13 shows another exemplary widget 40 in the form of a list 68 of a plurality of elements 68A-68E. In addition to providing the ability to move cursor 42 in a widget-to-widget manner, the methods disclosed herein may also be used to move cursor 42 element-to-element within list 68. For example, as explained above, a digital representation of grid 60 defining cells 62 and destination points 64 may be selected and superimposed over list 68 so that each element 68A-68E of list 68 may be disposed in a respective cell 62 and that movement of cursor 42 between elements 68A-68E may be controlled using the grid-based cursor control methods disclosed herein. Again, grid 60 and destination points 64 may be used in virtual (i.e., digital) form only and may not be displayed by display device 14 and consequently may be invisible to the user.

For some lists 68, the contents of (e.g., number of elements including rows and columns in) such lists 68 may vary during operation of aircraft 10. The number of elements 68A-68E may not necessarily be fixed and therefore grid 60 may need to be dynamically adjusted depending on the number of elements 68A-68E present in list 68. In such cases, a digital representation of a template grid 60 (e.g., having a variable number of cells 62) for list 68 may be stored in memory 54 and may be (e.g., dynamically) adjusted as required depending on the number of elements 68A-68E displayed in list 68. Grid 60 may also be adjusted based on the type of list 68 that may be selected. For example, list 68 may comprise either: a null list containing no elements; a list that is entirely displayed on the allocated display area and therefore does not require a scroll bar; or, a list that contains too many elements 68A-68E to be displayed on the allocated display area and therefore requires a scroll bar. Accordingly, in the event where widget 40 is a list, a dynamically adjustable grid 60 may be used to overlay a suitable number of cells 62 over respective elements 68A-68E of list 68 whether or not list 68 requires a scroll bar.

Figure 14:
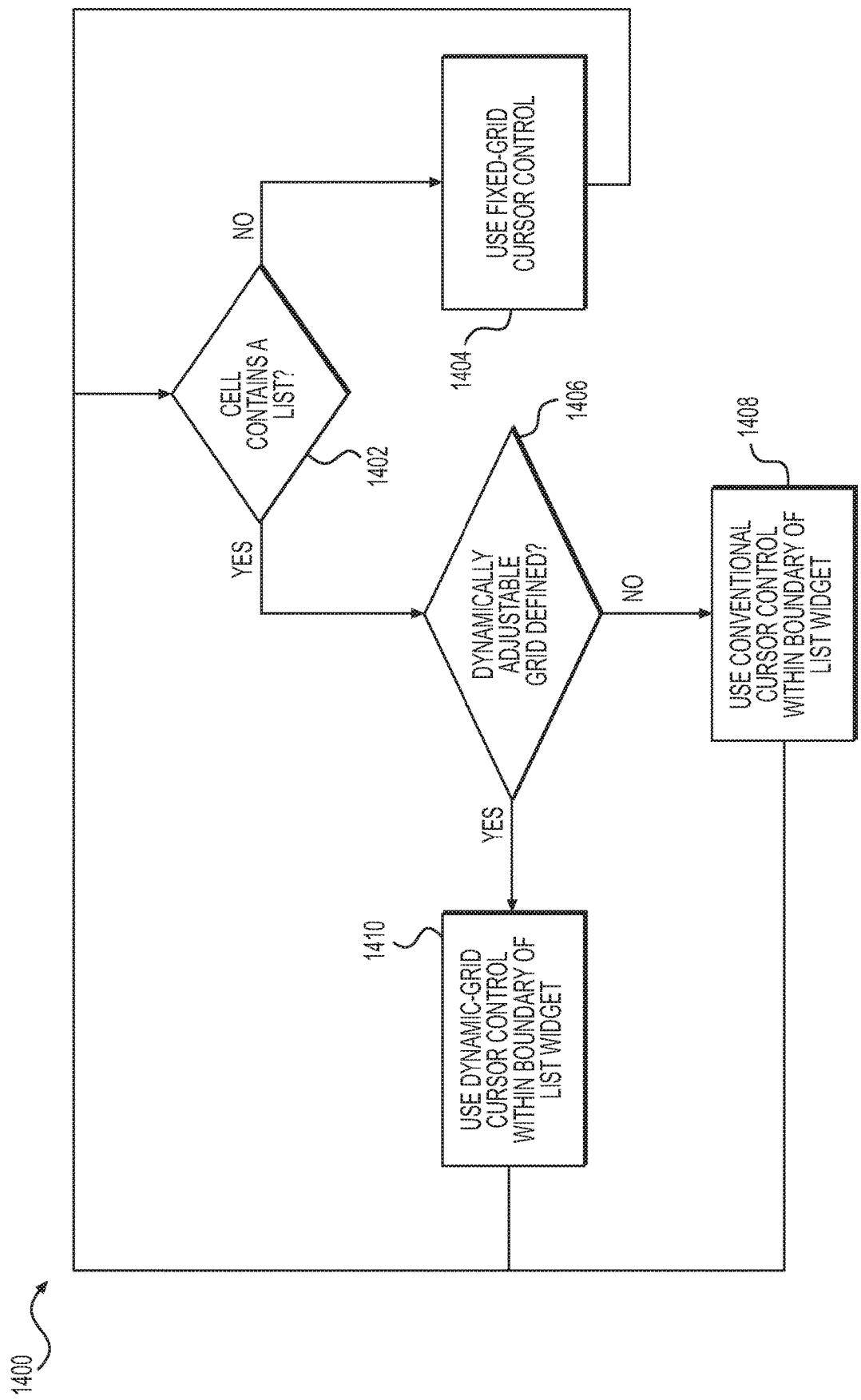
FIG. 14 is a flowchart illustrating an exemplary method for controlling the movement of the cursor in a list of elements.

FIG. 14 is a flowchart illustrating an exemplary method 1400 for controlling the movement of cursor 42 in list 68. Method 1400 may be part of method 700. Method 1400 may be executed in entirety or in part using computer 50 based on machine-readable instructions 56. Method 1400 may be used to determine a next position of cursor 42 based on instruction signal 48 indicative of desired movement of cursor 42 in a desired direction by the user. At decision block 1402, method 1400 may comprise determining whether widget 40 is a list. If it is determined that widget 40 is not a list, then cursor 42 may be controlled using fixed-grid cursor control as explained herein. Grid-based cursor control may comprise the use of grid 60, cells 62 and destination points 64 as described above. Alternatively, if it is determined that widget 40 is a list, then method 1400 may comprise at decision block 1406, determining whether a dynamically adjustable grid 60 may be defined for use with widget 40 if widget 40 is a list. If there is no dynamically adjustable grid 60 that is available for use with widget 40, then a conventional cursor control method may be used to control the movement of cursor 42 within the boundary of widget 40 (see block 1408). Conventional cursor control may comprise any suitable non grid-based cursor control methods. For example, conventional cursor control may comprise causing cursor 42 to move by steps of a fixed distance or by slewing irrespective of the contents of widget 40 and without use of any cells 62. Alternatively, if it is determined at decision block 1406 that a dynamically adjustable grid 60 is available for use with list 68 then it may be used to control the movement of cursor 42 within the boundary of list 68 (see block 1410). For example, such dynamic-grid cursor control method may be used to move cursor 42 between elements 68A-68E of list 68 and permit the selection of a desired item 68A-68E from list 68 in a predictable manner.

FIG. 15 shows a cursor located at border between first portion 38A of format 38 where grid-based cursor control may be used and second portion 38B of format 38 where conventional cursor control may be used. First portion 38A may comprise a region of format 38 where grid 60, cells 62 and destination points 64 may be used to control the movement of cursor 42. Accordingly, first portion 38A may comprise a group of cells 62 overlaid thereon. Conversely, second portion 38B may comprise a region of format 38 where grid 60, cells 62 and destination points 64 are not used for controlling movement of cursor 42 and some other conventional cursor control method may be used instead. Hence, when cursor 42 is moved between first portion 38A and second portion 38B, the method of controlling the movement of cursor 42 using MKP 22 may change accordingly. In some embodiments, the cursor control method may change only with respect to MKP 22 but the CCD 20 may still be used to control movement of cursor 42 the same way irrespective of which of first portion 38A and second portion 38B cursor 42 may be located.

FIGS. 16A-16C show formats 38 having different amounts of first portion 38A and second portion 38B. First portion 38A may comprise one or more regions within format 38. First portion 38A may also comprise one or more islands surrounded by second portion 38B.

FIG. 17A is a flowchart illustrating method 1700 for controlling the movement of cursor 42 when a last cell 62B in a desired direction is encountered and additional movement of cursor 42 in that same direction is requested by the user. Method 1700 may be part of method 700. Method 1700 may be executed in entirety or in part using computer 50 based on machine-readable instructions 56. FIG. 17B schematically illustrates the movement of cursor 42 associated with method 1700 when last cell 62B is encountered. In some embodiments, when cursor 42 is already positioned in a last cell 62B of a group of cells 62 in a particular (e.g., right) direction R and the user nevertheless requests that cursor 42 be moved farther in that same direction R via one of directional movement keys 32, cursor 42 may be moved to the corresponding border 70 of cell 62B. For example, in reference to FIG. 17B, if the cursor 42 is initially positioned at position 42A and the user requests that cursor 42 be moved in direction R, cursor 42 may then be moved to position 42B at or adjacent the corresponding right border 70 of cell 62B.

Accordingly, method 1700 may comprise receiving an instruction to move cursor 42 in a desired direction at block 1702. At decision block 1704, it may be determined whether or not cursor 42 is currently positioned in the last cell 62B in that particular desired direction. If it is determined that cursor 42 is within the last cell 62B, then cursor 42 may be repositioned at or adjacent the corresponding border 70 of cell 62B (see block 1706). Alternatively, if it is determined that cursor 42 is not within the last cell 62B in that particular desired direction, some other grid-based cursor control method as described herein may be used. Hence machine-readable instructions 56 may be configured to cause data processors 52 to, conditioned upon the cell in which cursor 42 is currently positioned being the last cell 62B in the display area 16 along the desired direction, determining the next position of cursor 42 to be adjacent or on a corresponding border 70 of the current cell 62B.

FIG. 18 is a flowchart illustrating method 1800 incorporating blocks from the methods of FIGS. 11, 14 and 17. Method 1800 may be part of method 700. Method 1800 may be executed in entirety or in part using computer 50 based on machine-readable instructions 56. Method 1800 may be used to control the movement of cursor 42 within a group of cells 62. The grid-based cursor control methods disclosed herein may also be used in formats 38 including dialog boxes or menus.

Aspects of the present invention are described herein with reference to flowchart illustrations and/or block diagrams of methods, systems and computer program products according to embodiments of the invention. It will be understood in light of the present disclosure that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer program instructions may also be stored in a computer readable medium (e.g., memory 54) that can direct a computer (e.g., computer 50), other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto computer 50, other programmable data processing apparatus, or other devices to cause a series of operational steps to be performed by computer 50, other programmable apparatus or other devices to produce a computer implemented process such that the instructions which execute on computer 50 or other programmable apparatus provide processes for implementing the functions/acts specified in the flowchart and/or block diagram block or blocks.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, one skilled in the relevant arts will appreciate that while the systems, methods and computer program products disclosed and shown herein may comprise a specific number of elements/components, the systems, methods and computer program products could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. A system for controlling the movement of a cursor on a display device in an aircraft where the display device provides a display area for displaying one or more widgets and the cursor, the system comprising;

a data processor and a non-transitory medium containing machine-readable instructions executable by the data processor and configured to cause the data processor, upon receipt of an instruction signal being generated by an input device in response to an instruction from a user indicative of a desired movement of the cursor in a desired direction in the display area of the display device, to:

using a digital representation of a grid defining a plurality of cells overlaying at least a portion of the display area, identify a current cell from the plurality of cells in which the cursor is currently positioned, the current cell having a predetermined destination point disposed in the current cell, the destination point in the current cell corresponding to a point of arrival in the current cell for the cursor, wherein the destination point represents an initial jump-to position of the cursor when the cursor arrives in the current cell and wherein, in at least one of the plurality of cells, the destination point coincides with one of the one or more widgets;

using the identification of the current cell, the destination point in the current cell and the instruction signal, determine a next position of the cursor in the display area;

when the instruction signal is indicative of desired cursor movement away from the destination point in the current cell, determine the next position of the cursor to be in a next cell adjacent the current cell; and generate a signal useful in causing the cursor to jump to the determined next position in the display area.

2. The system as defined in claim 1, wherein the grid defining the plurality of cells is invisible on the display device.

3. The system as defined in claim 1, wherein the input device comprises a keypad.

4. The system as defined in claim 1, wherein the input device comprises a directional movement key.

5. The system as defined in claim 1, wherein the machine-readable instructions are configured to cause the data processor to, when the instruction signal is indicative of desired cursor movement toward the destination point in the current cell, determine the next position of the cursor to correspond to the destination point in the current cell.

6. The system as defined in claim 5, comprising determining the next position of the cursor to correspond to the destination point in the current cell when the cursor is within a threshold distance from the destination point in the current cell.

7. The system as defined in claim 6, wherein the threshold distance is a foveal distance associated with a visual field of the user.

8. The system as defined in claim 1, wherein the machine-readable instructions are configured to cause the data processor to:

when the instruction signal is indicative of desired cursor movement toward the destination point in the current cell, and, when a widget inside the current cell has an inactive focus, determine the next position of the cursor to correspond to the destination point in the current cell.

9. The system as defined in claim 1, wherein the machine-readable instructions are configured to cause the data processor to, when a widget inside the current cell has an active focus, determine the next position of the cursor to be in the next cell adjacent the current cell.

10. The system as defined in claim 1, wherein the next position of the cursor corresponds to a destination point in the next cell.

11. The system as defined in claim 10, wherein the destination point in the next cell is positioned to prevent at least some obstruction of information displayed in the next cell by the cursor.

12. The system as defined in claim 1, wherein the machine-readable instructions are configured to cause the data processor to, when the current cell is the last cell in the display area along the desired direction, determine the next position of the cursor to be adjacent or on a border of the current cell.

13. The system as defined in claim 1, wherein two or more of the plurality of cells are of different sizes.

14. The system as defined in claim 1, wherein two or more of the plurality of cells each contain a single one of the one or more widgets.

15. The system as defined in claim 1, wherein at least some of the plurality of cells have a rectangular shape.

16. The system as defined in claim 1, wherein the input device comprises an alternate means of controlling the cursor and the system further comprises a primary cursor control device.

17. The system as defined in claim 1, wherein the one or more widgets comprise a list of items and each item is contained in a respective cell.

18. The system as defined in claim 17, wherein the grid is dynamically adjustable based on the number of items in the list.

19. An aircraft comprising the system as defined in claim 1.

20. A computer-implemented method for controlling a movable cursor on a display device in an aircraft where the display device defines a display area for displaying one or more widgets and the cursor, the method comprising;

receiving an instruction from a user indicative of a desired movement of the cursor in a desired direction in the display area of the display device;

using a digital representation of a grid defining a plurality of cells overlaying at least a portion of the display area, identifying a current cell from the plurality of cells in which the cursor is currently positioned, the current cell having a predetermined destination point disposed in the current cell, the destination point corresponding to a point of arrival in the current cell for the cursor, wherein the destination point represents an initial jump-to position of the cursor when the cursor arrives in the current cell and wherein, in at least one of the plurality of cells, the destination point coincides with one of the one or more widgets;

using the identification of the current cell, the destination point in the current cell and the instruction from the user, determining a next position of the cursor in the display area;

when the instruction signal is indicative of desired cursor movement away from the destination point in the current cell, determining the next position of the cursor to be in a next cell adjacent the current cell; and generating a signal useful in causing the cursor to jump to the determined next position in the display area.

21. A computer program product for controlling a movable cursor on a display device in an aircraft where the display device defines a display area for displaying one or more widgets and the cursor, the computer program product comprising a non-transitory computer readable storage medium containing program code, the program code readable/executable by a computer, processor or logic circuit to perform a method comprising:

receiving an instruction from a user indicative of a desired movement of the cursor in a desired direction in the display area of the display device;

using a digital representation of a grid defining a plurality of cells overlaying at least a portion of the display area, identifying a current cell from the plurality of cells in which the cursor is currently positioned, the current cell having a predetermined destination point disposed in the current cell, the destination point corresponding to a point of arrival in the current cell for the cursor, wherein the destination point represents an initial jump-to position of the cursor when the cursor arrives in the current cell and wherein, in at least one of the plurality of cells, the destination point coincides with one of the one or more widgets;

using the identification of the current cell, the destination point in the current cell and the instruction from the user, determining a next position of the cursor in the display area;

when the instruction signal is indicative of desired cursor movement away from the destination point in the current cell, determining the next position of the cursor to be in a next cell adjacent the current cell; and generating a signal useful in causing the cursor to jump to the determined next position in the display area.

* * * * *